United States Patent
Van Der Werf et al.

(10) Patent No.: US 8,390,208 B2
(45) Date of Patent: Mar. 5, 2013

(54) DRIVE CIRCUITS FOR ELECTRO-LUMINESCENT LAMPS

(75) Inventors: Ronald Van Der Werf, Waalre (NL); Jacobus Govert Sneep, Bavel (NL); Arjan Van Den Berg, Shanghai (CN)

(73) Assignee: NXP B.V., Eindhoven (NL)

( * ) Notice: Subject to any disclaimer, the term of this patent is extended or adjusted under 35 U.S.C. 154(b) by 401 days.

(21) Appl. No.: 12/811,264

(22) PCT Filed: Dec. 29, 2008

(86) PCT No.: PCT/IB2008/055558
§ 371 (c)(1), (2), (4) Date: Jun. 30, 2010

(87) PCT Pub. No.: WO2009/087535
PCT Pub. Date: Jul. 16, 2009

(65) Prior Publication Data
US 2010/0283410 A1 Nov. 11, 2010

(30) Foreign Application Priority Data
Jan. 10, 2008 (EP) .................................... 08100339

(51) Int. Cl.
*H05B 37/02* (2006.01)
(52) U.S. Cl. ...................... 315/209 R; 315/291; 315/307
(58) Field of Classification Search ............... 315/209 R, 315/224, 225, 276, 291, 307, 308, 312
See application file for complete search history.

(56) References Cited

U.S. PATENT DOCUMENTS

| | | | |
|---|---|---|---|
| 5,227,696 A | 7/1993 | Asars | |
| 5,313,141 A | 5/1994 | Kimball | |
| 5,347,198 A | 9/1994 | Kimball | |
| 5,982,104 A | 11/1999 | Sasaki et al. | |
| 6,421,034 B1 * | 7/2002 | Mihara | 345/76 |
| 6,841,950 B1 | 1/2005 | Walker | |
| 7,221,106 B1 * | 5/2007 | Nemir et al. | 315/291 |
| 2002/0113558 A1 | 8/2002 | Buell et al. | |
| 2008/0197787 A1 | 8/2008 | Nyman | |

FOREIGN PATENT DOCUMENTS

| | | |
|---|---|---|
| EP | 0899989 A2 | 3/1999 |
| WO | 2005/116964 A1 | 12/2005 |
| WO | 2006/062936 A2 | 6/2006 |
| WO | 2007/091020 A1 | 8/2007 |
| WO | 2008/123932 A2 | 10/2008 |
| WO | WO 2008123932 A2 * | 10/2008 |

OTHER PUBLICATIONS

International Search Report and Written Opinion for Application PCT/IB2008/05558 (Dec. 29, 2009).

\* cited by examiner

*Primary Examiner* — Jimmy Vu

(57) ABSTRACT

A drive circuit for delivering an AC voltage to an array of electro-luminescent lamps ($8a$ to $8n$) includes a single coil (1), the energy in which is transferred to each lamp through a corresponding switch assembly ($10a$ to $10n$) having positive and negative-going paths for conducting positive and negative voltages to the corresponding lamp. The magnitudes of the voltages applied to the parallel-connected lamps are controllable so that the illumination levels of the lamps are individually adjustable.

7 Claims, 3 Drawing Sheets

DRIVE CIRCUITS FOR ELECTRO-LUMINESCENT LAMPS

Figure 1:
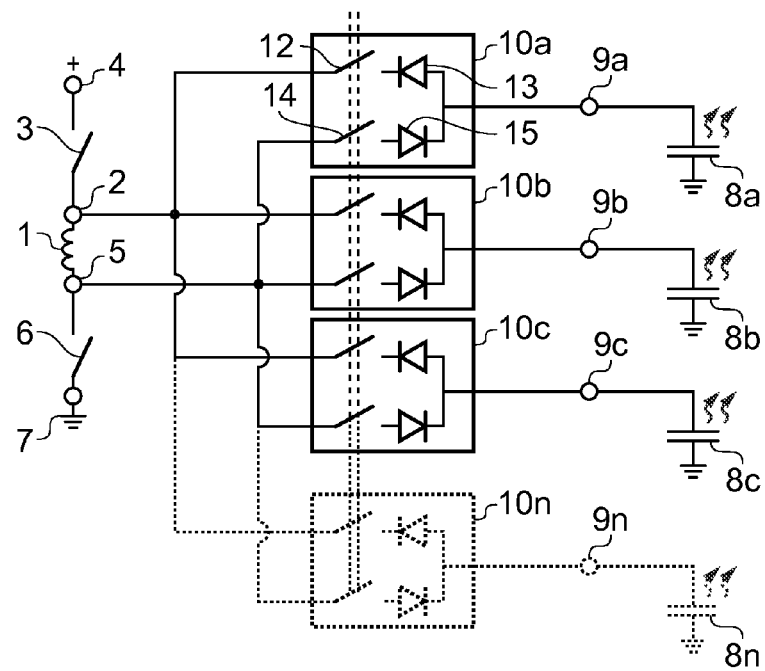

This invention relates to drive circuits for electro-luminescent (EL) lamps.

EL lamps are capacitive elements which glow in the presence of a strong electric field created by the application of an AC voltage. EL lamps are thin panels and are used to illuminate panel displays in mobile phones, watches and car instruments, for example. U.S. Pat. Nos. 5,313,141 and 5,982,104 disclose circuits for powering a single EL lamp and U.S. Pat. Nos. 5,347,198 and 6,841,950 disclose circuits for powering multiple EL lamps. The invention is concerned with a novel way of driving a plurality of EL lamps.

According to the invention there is provided a drive circuit for delivering voltages of alternating polarity to a plurality of output terminals each of which is intended to be connected to a corresponding electro-luminescent (EL) lamp, wherein the circuit comprises a coil having a first node or terminal for delivering a positive voltage and a second node or terminal for delivering a negative voltage, the first node or terminal and the second node or terminal being connected to each output terminal through a corresponding switch assembly so that for each output terminal there is a corresponding switch assembly, each switch assembly comprising a positive voltage path with a positive voltage control switch and positive-going unidirectional circuitry allowing the transfer to the corresponding output terminal of a positive voltage but not a negative voltage, and a negative voltage path with a negative voltage control switch and negative-going unidirectional circuitry allowing the transfer to the corresponding output terminal of a negative voltage but not a positive voltage, and control circuitry for controlling the positive-going control switch and the negative-going control switch whereby the magnitude of the positive and negative voltages applied to each output terminal can be individually controlled.

Thus, by recourse to the invention a single coil can be used to generate energy which is selectively distributed to a plurality of EL lamps the illumination levels of which can be individually controlled.

Preferably, the second node or terminal of the coil is connected to a positive voltage through a first switch and the first node or terminal of the coil is connected to ground through a second switch, closure of these two switches causing the coil to be charged with subsequent opening of the first switch causing the second node or terminal to deliver a negative voltage and the subsequent opening of the second switch causing the first node or terminal to deliver a positive voltage.

In the preferred embodiment the unidirectional circuitry of each switch assembly includes MOSFET transistors.

Further, the positive voltage switch and the negative voltage switch of each switch assembly may be controlled by means of a feedback loop receiving signals dependent on the voltages generated at the first and second nodes or terminals and/or voltages generated at the output terminals themselves.

Figure 2:
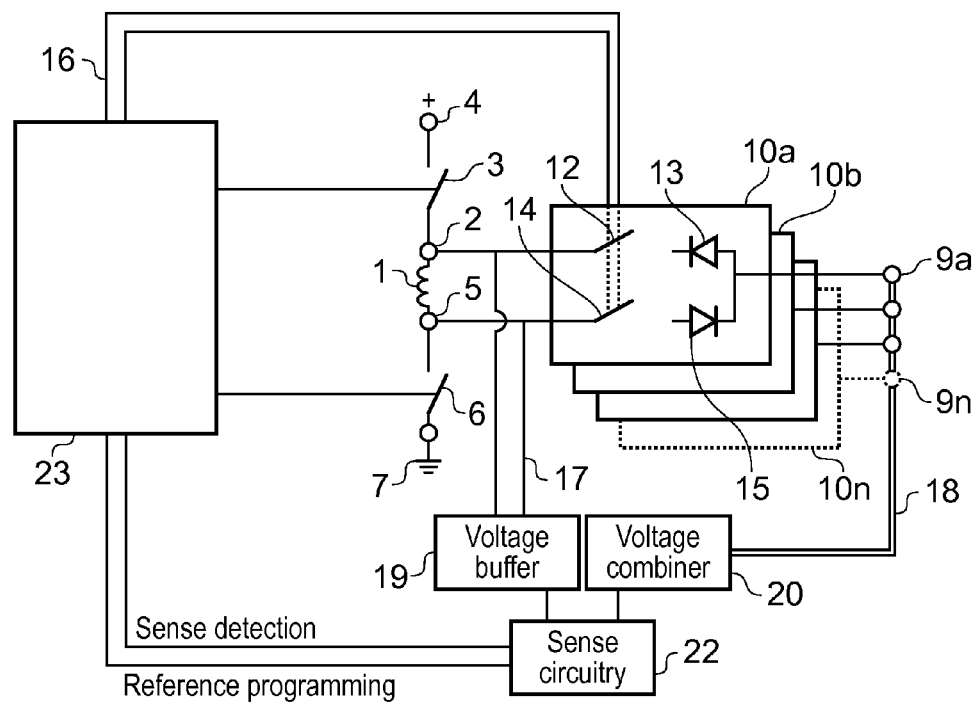
Figure 3:
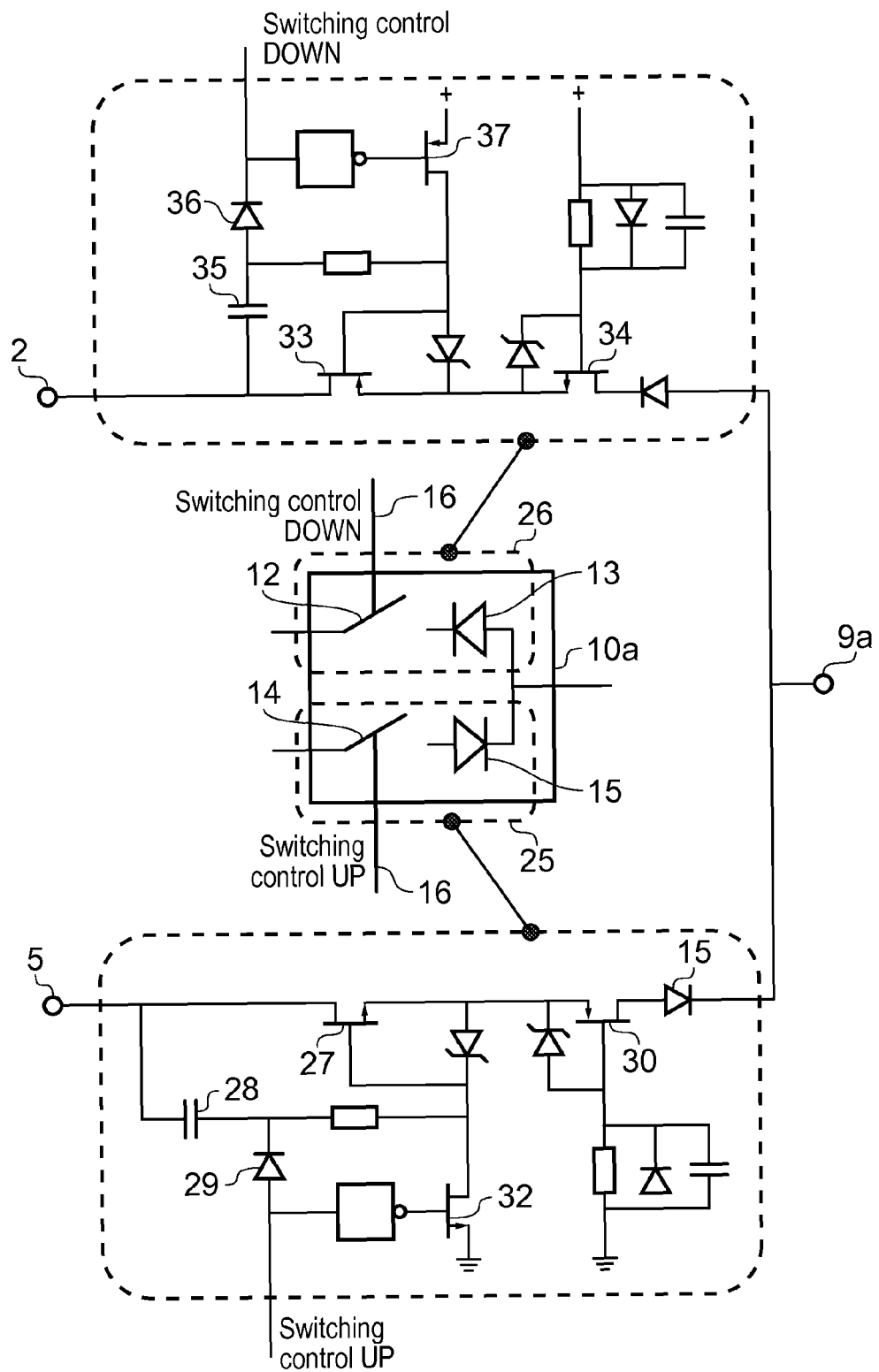

Embodiments of the invention will now be further described with reference to the accompanying drawings in which:

FIG. 1 is a circuit diagram depicting a preferred embodiment of drive circuit according to the invention, FIG. 2 shows the circuit diagram of FIG. 1 with the addition of a feedback loop for controlling switches of the circuit, FIG. 3 shows in more detail one example of electronic components used in switch assemblies of the circuit of FIG. 1 or 2, and FIGS. 4 and 5 show voltage-measuring circuits which can be used with the drive circuits of FIGS. 1 to 3.

The drive circuit shown in FIG. 1 has an inductive coil 1 one node or terminal 2 of which is connected through a PMOS switch 3 to a positive DC terminal 4. The other node or terminal 5 of the coil is connected through an NMOS switch 6 to earth or ground 7.

The coil 1 delivers energy to a plurality of electro-luminescent lamps (8a, 8b . . . 8n) which are essentially individual capacitors having the ability to glow in the presence of an alternating voltage applied across the capacitor plates. Each lamp (8a to 8n) is connected between a corresponding output terminal (9a to 9n) of the circuit and ground so the lamps are allowed to have a common ground connection. The pair of nodes 2, 5 are connected to the first output terminal 9a through a first switch assembly 10a represented by the uppermost rectangular box in FIG. 1. Similarly, the nodes 2, 5 are connected to the remaining output terminals 9b to 9n through respective switch assemblies (10b to 10n). The lamps are thus connectable in parallel with the coil through the respective switch assemblies. The switch assemblies (10a to 10n) are identical in structure and operation so the immediately following description refers only to the first assembly 10a.

The assembly 10a has a control switch 12 in series with unidirectional circuitry (depicted as a diode 13) to form a connection capable of delivering a negative voltage from the node 2 to the output terminal 9a. Also, the assembly 10a has a control switch 14 in series with unidirectional circuitry (depicted as a diode 15) to form a connection capable of delivering and maintaining a positive voltage from the node 5 to the output terminal 9a.

Commencing with the switches (3, 6, 12, 14) in the open condition, the coil 1 is uncharged and there is no electrical connection through the switch assembly 10a for positive or negative voltages. In practice, one of the switches 3 or 6 is always closed. Closure of the switches (3 and 6) causes the coil 1 to become charged. Opening the switch 6 will cause a positive voltage to be present at the node 5 and this voltage is capable of being transmitted through the positive-going unidirectional circuitry of the switch assembly 10a under the control of the switch 14. Thus, a positive voltage controlled in magnitude and duration by the switch 14 is applied to the output terminal 9a and thus a progressively increasing charge is applied to the lamp 8a. After transfer of energy to the output terminal 9a, the voltage at node 5 will drop and the diode 15 will maintain the energy at the output terminal 9a. During the energy package transfer from the coil towards the output terminals the switch 14 remains closed.

Similarly, energy can be accumulated in the coil 1 and then opening of the switch 3 will cause a negative voltage at node 2 to be conducted through the negative-going unidirectional circuitry of the switch assembly 10a under the control of the switch 12. This causes a progressively increasing negative voltage to be applied to the lamp 8a, the diode 13 preventing the reverse flow of energy.

The complete drive circuit thus enables all the lamps (8a to 8n) to be driven by the repetitive transfer of energy from the single coil 1, with each lamp being individually controlled in terms of the applied magnitude and direction of the positive and negative voltages, so that the illumination intensity of each lamp can be governed and controlled in any manner determined by the operation of the control switches (12 and 14) in the switch assemblies. In practice the lamps are energised at a frequency of about 300 $H_z$ with an amplitude of about 120 volts or more.

FIG. 2 is based on the circuitry of FIG. 1 and common components bear the same reference numerals. FIG. 2 differs from FIG. 1 in having a feedback loop 16 governing operation of the control switches (e.g. switches 12 and 14) in each switch assembly (10a to 10n). The loop 16 is fed (by a connection 17) with signals representative of voltage amplitudes at the nodes 2 and 5 and/or by connections 18 with signals representative of voltage amplitudes at the individual output terminals (9a to 9n). A voltage buffer 19 receives signals from the nodes 2 and 5 and a voltage combiner 20 receives signals from the output terminals (9a to 9n). Sensing circuitry 22 and control circuitry 23 are included in the loop to yield the feedback signals applied to the individual control switches in each switch assembly (10a to 10n).

The feedback control transfers additional energy packages to the output terminals or to transfer them to other output terminals or to stop such transfer. The voltage at the output terminal is therefore controlled by the number of transferred energy packages.

The control circuitry 23 also controls opening and closing of the switches (3 and 6) to generate the positive and negative voltages at the nodes 5 and 2 respectively.

The described circuit can drive each lamp to increase its voltage until a desired AC voltage amplitude (and therefore illumination level) is reached. For example, a first lamp may require a low voltage level, a second lamp may require a medium voltage level and a third lamp may require a high voltage level. Initially all three lamps are charged, ramping up their voltages. The first lamp is disconnected from the coil when its voltage reaches the low level. The second lamp is disconnected when its voltage reaches the medium voltage level and finally the third lamp is disconnected when its voltage reaches the high voltage level.

FIG. 3 shows in more detail the components of the exemplary switch assembly 10a linking the nodes (2 and 5) and the exemplary output terminal 9a. The positive-going path is shown within the dotted line 25 which is expanded in the lower part of the Figure. The negative-going path is shown within the dotted line 26 which is expanded in the upper part of the Figure.

Considering the positive-going path shown in the lower part of FIG. 3, when the representative output terminal 9a is selected by closure of the control switch 14 an NMOS transistor 27 conducts the positive voltage from the node 5 to the terminal 9a. The transistor 27 conducts when its gate voltage is driven sufficiently high by a capacitor 28 which is precharged via a diode 29 to decrease switching losses. A PMOS transistor 30 blocks transmission of a negative voltage from the output terminal to the coil. When the diode 15 is conducting, whilst the output is negative, the transistor 30 will prevent this undesired leakage. FIG. 3 also shows the control signal which comes from the feedback loop 16 and controls operation of the switch 14, by means of precharging capacitor 28 and the transistor 32.

If more than one output terminal is powered simultaneously the energy stored in the coil is transferred to the outputs to be powered and the energy will be distributed between the lamps connected to those outputs.

The negative-going path of the exemplary switch assembly works in a similar manner. There is a PMOS transistor 33 which conducts negative voltages through an NMOS transistor 34 which corresponds to the diode 13 of FIG. 2. There is a capacitor 35 (corresponding to the capacitor 28), a diode 36 (corresponding to the diode 29) and a transistor 37 (corresponding to the transistor 32).

Figure 4:
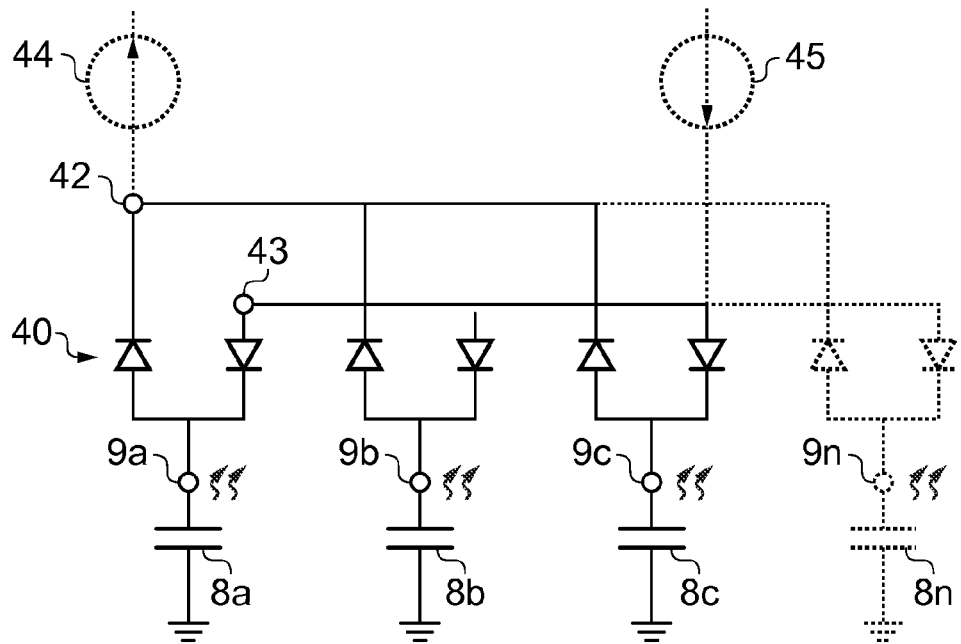

As mentioned, the output voltages of all the powered output terminals can be measured at the node 5 for (positive voltages) and at the node 2 (for negative voltages). One disadvantage of this method is that the node voltage may differ from the voltage at the selected output terminal. A more accurate way of determining voltages is illustrated in FIG. 4 using diode peak detectors 40 and involves connecting at one node 42 all the positive voltages from the selected output terminals through a first set of diode peak detectors, and similarly using a second set of diode peak detectors to connect at another node 43 all the negative voltages from the selected output terminals. In this way, the node 42 can be used to measure the positive boosted output voltage and the node 43 can be used to measure the negative boosted output voltage of all parallel driven outputs. In addition, the nodes 42 and 43 can be used to discharge all multiple lamps using a single discharge circuit 44 at the node 42 for the positive voltages and another single discharge circuit 45 at the node 43 for the negative voltages. The voltages determined in the circuit of FIG. 2 may be fed into the feedback loop 16, by means of the connections 18.

Figure 5:
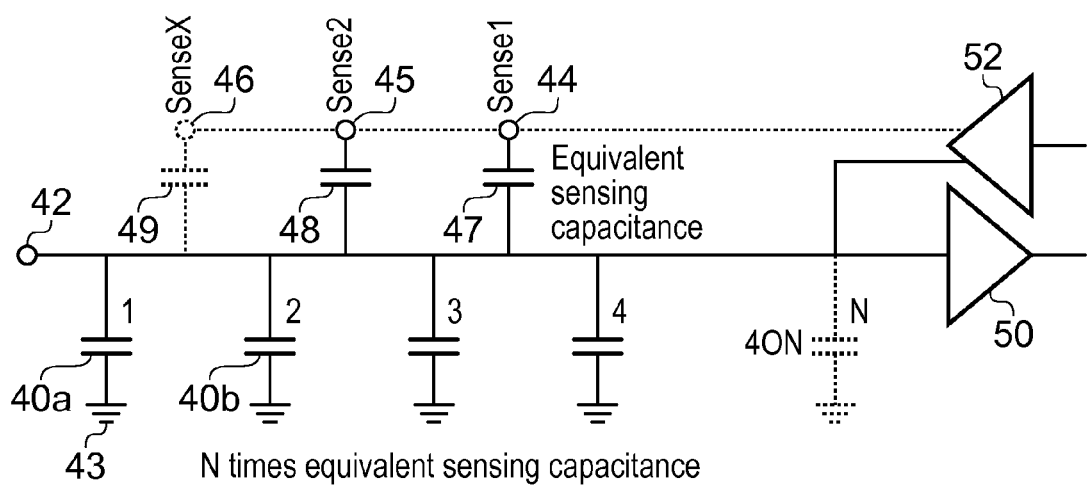

The capacitive divider of FIG. 5 is used to measure the high voltages at the output terminals 9a to 9n and/or at the nodes 2, 5.

The divider reduces the comparatively high voltage (at a selected output terminal 9a to 9n or at the node 2 or 5) to a lower voltage which is more easily processed and measured. This is achieved by means of a plurality of capacitors 40A, 40B . . . 40N connected in parallel between a sensing node 42 and ground 43. The high voltage is connected to a terminal 44, 45, 46 each of which is connected to the sensing node 42 through a corresponding capacitor 47, 48, 49. An amplifier 50 detects the voltage at the sensing node 42 and the output of the amplifier 50 is used to control the signals fed into the feedback loop 16. A precharge/reset circuit 52 controls the voltage across each capacitor 47, 48, 49 prior to and during sensing or detection.

The voltage difference between the selected terminal 44, 45, 46 and ground is split between the corresponding capacitor 47, 48, 49 and the parallel array of capacitors 40A, 40B . . . 49N. The parallel array has a larger effective capacitance than any individual capacitor 47, 48, 49 so the major part of the voltage difference occurs across the individual capacitor, the ratio of voltage drops being in proportion to the ratio of effective capacitances. Thus, the amplifier 50 detects a reduced scaled down voltage.

The voltage detected in the circuit of FIG. 5 may drive the feedback loop 16 while monitoring the high voltages by means of the connection 17 (in the case of voltages at the nodes 2, 5) or by means of the connections 18 (in the case of voltages at the output terminals).

Whilst the invention has been described with reference to electro-luminescent lamps, it will be appreciated that the drive circuit configurations embodying the invention may be employed to drive other loads.

From reading the present disclosure, other variations and modifications will be apparent to persons skilled in the art. Such variations and modifications may involve equivalent and other features which are already known in the art, and which may be used instead of or in addition to features already described herein.

Although claims have been formulated in this application to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new claims may be formulated to such features and/or combinations of such features during the prosecution of the present Application or of any further Application derived therefrom.

The invention claimed is:

1. A drive circuit for delivering voltages of alternating polarity to a plurality of output terminals, each of which is intended to be connected to a corresponding electro-illuminescent lamp, wherein the circuit comprises:

a coil having a first node or terminal for delivering a positive voltage and a second node or terminal for delivering a negative voltage, the first node or terminal and the second node or terminal being connected to each output terminal through a corresponding switch assembly so that for each output terminal there is a corresponding switch assembly, each switch assembly comprising, a positive voltage path with a positive voltage control switch and positive-going unidirectional circuitry allowing the transfer to the corresponding output terminal of a positive voltage but not a negative voltage, and a negative voltage path with a negative voltage control switch and negative-going unidirectional circuitry allowing the transfer to the corresponding output terminal of a negative voltage but not a positive voltage, and control circuitry for controlling the positive-going control switch and the negative-going control switch, whereby the magnitudes of the positive and negative voltages applied to each output terminal are individually controllable and wherein the control circuitry is included in a feedback loop and wherein the positive voltage switch and the negative voltage switch of each switch assembly are controlled by the feedback loop which is operable to receive signals dependent on the voltages generated at the first and second nodes or terminals and/or the voltages at the output terminals.

2. The drive circuit according to claim 1, wherein the second node or terminal of the coil is connected to a positive voltage through a first switch and the first node or terminal of the coil is connected to ground through a second switch, such that closure of the switches causes the coil to be charged with subsequent opening of the first switch causes the second node or terminal to deliver a negative voltage and the subsequent opening of the second switch causing the first node or terminal to deliver a positive voltage.

3. The drive circuit according to claim 1, wherein the unidirectional circuitry of each switch assembly includes MOSFET transistors.

4. The drive circuit according to claim 1, wherein the control circuitry is operable to raise each output terminal to a desired maximum output voltage specific to that terminal, enabling each lamp to be driven to a desired maximum voltage and hence illumination level.

5. A drive circuit according to claim 1, wherein the signals representative of the magnitudes of the voltages at the output terminals are measurable by a diode peak detector array comprising, at each output terminal, a pair of diodes one for measuring positive voltages and the other for measuring negative voltages.

6. A drive circuit according to claim 1, wherein a capacitive divider is used to measure scaled-down values of the high voltages at the output terminals and/or at the nodes.

7. The drive circuit according to claim 6, wherein the capacitive divider comprises a parallel array of capacitors and individual capacitors, the measured voltage being measured across the parallel array which has an effective capacitance larger than each individual capacitor.

\* \* \* \* \*